United States Patent [19]

Roy et al.

[11] 3,886,444
[45] May 27, 1975

[54] HYDROGEN DETECTOR FOR SODIUM COOLED REACTORS

[75] Inventors: Prodyot Roy, Saratoga; Douglas N. Rodgers, San Jose, both of Calif.

[73] Assignee: The United States of America as represented by the United States Energy Research and Development Administration, Washington, D.C.

[22] Filed: Feb. 7, 1974

[21] Appl. No.: 440,627

[52] U.S. Cl. .................................. 324/33; 73/19
[51] Int. Cl. ..................... G01n 27/00; G01n 7/10
[58] Field of Search .................... 324/33; 73/19, 23; 204/195 P

[56] References Cited
UNITED STATES PATENTS
| | | | |
|---|---|---|---|
| 3,426,579 | 2/1969 | Lebel et al. | 73/23 |
| 3,683,272 | 8/1972 | Vissers et al. | 324/33 |
| 3,731,523 | 5/1973 | Vissers et al. | 73/19 |

OTHER PUBLICATIONS
F. J. Norton, "Diffusion of Hydrogen from Water through Steel," Journal of Applied Physics, Volume 11, April 1940, pp. 262–267.

P. Roy, D. N. Rodgers, "Characterization of a Diffusion Tube Hydrogen Detector in a Dynamic Sodium System," Nuclear Technology, Vol. 12, Dec. 1971, pp. 388–392.

Primary Examiner—Alfred E. Smith
Assistant Examiner—Rolf Hille
Attorney, Agent, or Firm—John A. Horan; F. A. Robertson; L. E. Carnahan

[57] ABSTRACT

An improved hydrogen detector for use in sodium cooled reactors. The improved detector basically comprises a diffusion tube of either pure nickel or stainless steel having a coating on the vacuum side (inside) of a thin layer of refractory metal, e.g., tungsten or molybdenum. The refractory metal functions as a diffusion barrier in the path of hydrogen diffusing from the sodium on the outside of the detector into the vacuum on the inside, thus by adjusting the thickness of the coating, it is possible to control the rate of permeation of hydrogen through the tube, thereby providing a more stable detector.

3 Claims, 1 Drawing Figure

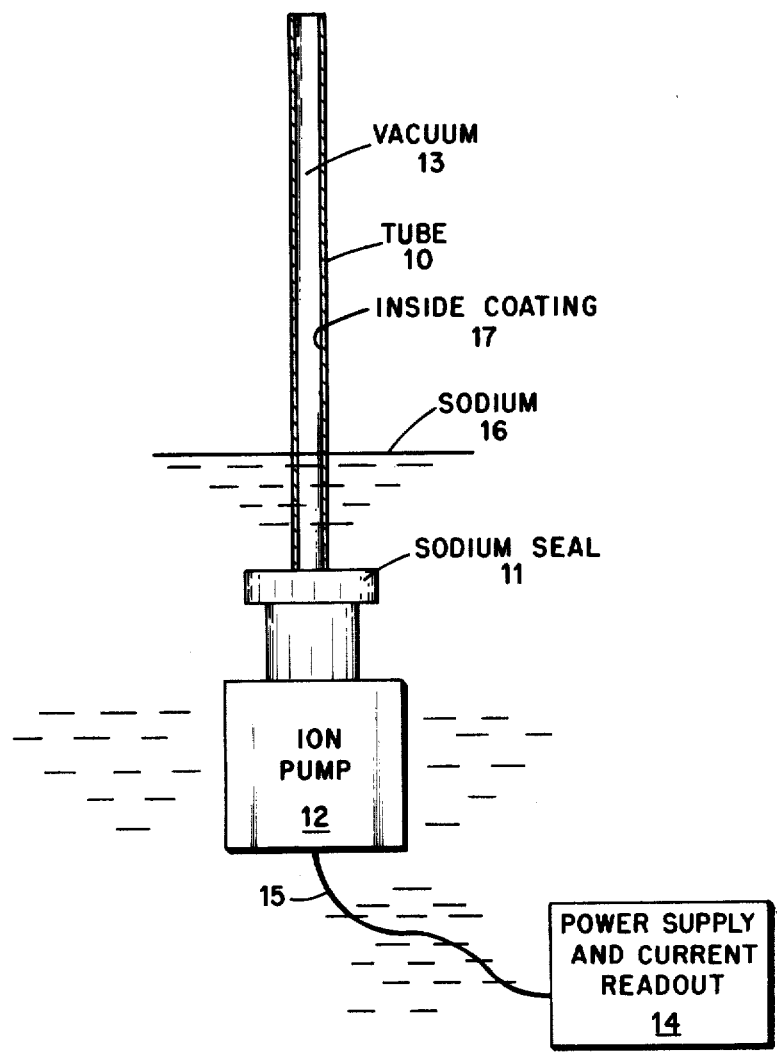

HYDROGEN DETECTOR FOR SODIUM COOLED REACTORS

BACKGROUND OF THE INVENTION

The invention described herein was made in the course of, or under, Contract No. AT(04-3)-189, Project Agreement No. 15, with the United States Atomic Energy Commission.

This invention relates to the measurement of hydrogen in liquid sodium, and more specifically to an improved detector for measuring the hydrogen concentration in sodium in both primary and secondary coolant circuits in liquid metal fast breeder reactors.

The development of sodium-cooled nuclear reactors has generated a great deal of concern regarding the type and levels of impurities in the liquid sodium coolant. One such area of concern is the hydrogen concentration level in the sodium coolant system. Hydrogen can enter the sodium coolant in a number of ways, some of which include water leakage occurring in the steam generator tubes, air with its associated moisture entering during the changing of fuel elements, and hydrogen diffusion through the walls of the steam generator tubes. The determination of this hydrogen concentration is extremely important for several reasons. First, water leakage occurring in the steam generator can cause severe damage. While there are devices, known as leak detectors, whose function is to detect such water leakage, the sensitivity of such devices in most cases will be controlled by the general hydrogen level in the liquid sodium. Therefore, if these leak detectors are to perform properly with the required sensitivity, the general or normal hydrogen concentration in the liquid sodium must be known. Secondly, tritium decontamination in sodium-cooled nuclear reactors is very important. Since tritium is associated with the hydrogen in liquid sodium, knowledge of the hydrogen concentration will help determine the location of the tritium in the liquid sodium, the concentration of the tritium, and the best methods for removal of the tritium from the liquid sodium. Finally, knowledge of the hydrogen concentration will help avoid plugging of the sodium cooling system caused by the formation of sodium hydride, which will occur with certain hydrogen concentration and temperature conditions.

Without accurate measurements of the hydrogen concentration, also referred to as hydrogen activity, the above-mentioned purposes for obtaining such measurements cannot be met. Since the sodium coolant of a sodium-cooled nuclear reactor will have a normal hydrogen concentration level in the range of about 0.1 to 2.0 parts-per-million (ppm), such a device and method should be sufficiently precise so as to be able to detect hydrogen concentration as low as 0.1 ppm to an accuracy of ± 0.05 ppm.

Various method and devices for measuring the hydrogen concentration in liquid sodium have been developed, and generally consist of a thin diffusion tube submerged in liquid sodium with a high vacuum maintained inside the tube which permits the hydrogen dissolved in the sodium coolant to permeate through the tube wall into the vacuum side, an ion pump being used to maintain the high vacuum with the ion pump current giving the measure of hydrogen flux. U.S. Pats. Nos. 3,683,272 issued Aug. 8, 1972 and 3,731,523 issued May 8, 1973, each in the name of Vissers et al and assigned to the same assignee of this invention, exemplify the prior art hydrogen concentration measuring devices.

The diffusion tubes of the prior known hydrogen detectors are usually made of pure nickle or stainless steel. When these materials are placed in flowing sodium they are subject to compositional changes due to leaching and depositions of the alloy constituents of the material used to contain the sodium, normally a 300 series stainless steel. The diffusion characteristics of the tubes also depend on the degree of cold work, grain size, etc. When the tubes are placed in high temperature sodium they are subject to thermal ageing. The compositional changes along with thermal ageing changes the diffusion coefficients of these tubes during the course of operation, hence they require frequent re-calibration. Thus, a need has existed for a hydrogen concentration measuring device which provides the accuracy needed while eliminating the need for periodic re-calibration of such devices.

SUMMARY OF THE INVENTION

The present invention is directed to an improved hydrogen detector for sodium-cooled reactors which overcomes the calibration drift problems of the prior detectors while providing high sensitivity and fast response time to changes in the hydrogen concentration. This improvement is accomplished basically by coating the inside (vacuum side) of the diffusion tube with a thin layer of refractory metal, such as tungsten or molybdenum which controls the hydrogen diffusion through the tube such that on-line operation compositional changes of the tube has no effect on the detector calibration.

Accordingly, it is an object of the invention to provide an improved hydrogen detector.

A further object of the invention is to provide an improved hydrogen detector for use in sodium-cooled nuclear reactors.

Another object of the invention is to provide an improved hydrogen detector for use in sodium-cooled reactors, the calibration of which does not drift during on-line operations.

Another object of the invention is to provide an improved hydrogen detector for sodium-cooled reactors which is calibration stable, has high sensitivity, and has relatively fast response time.

Other objects of the invention will become apparent from the following description and accompanying drawing.

BRIEF DESCRIPTION OF THE DRAWING

The single FIGURE schematically illustrates a hydrogen detector incorporating the invention.

DESCRIPTION OF THE INVENTION

A major concern in liquid metal fast breeder reactors, as pointed out above, is measuring the hydrogen concentration in sodium in both the primary and secondary circuits. This measurement is required for determining overall sodium purity and for the detection of water leaks in the secondary circuits. These applications require: (1) a stable sensor which does not drift during on-line operations, (2) a high sensitivity, and (3) relatively fast response time to changes in the hydrogen concentration. Freedom from calibration drift is especially important for the reliable detection of small changes in hydrogen concentration; a small leak in a sodium-to-water heat exchanger may change the hydrogen concentration significantly.

Broadly, the invention utilizes a thin diffusion tube submerged in liquid sodium. A high vacuum is maintained inside the tube which permits the hydrogen dissolved in the sodium to permeate through the tube wall into the vacuum side. An ion pump maintains the high vaccum and the ion pump current gives the measure of hydrogen flux or concentration in the sodium. The inside or vaccum side of the diffusion tube is coated with a thin layer of refractory metal which functions as a diffusion barrier in the path of hydrogen diffusing from the sodium on the outside of the detector into the vacuum on the inside. By adjusting the thickness of the refractory metal coating on the inside of the tube, it is possible to control the rate of permeation of hydrogen through the tube by diffusion through the refractory metal coating. Since the refractory metal coating will control the hydrogen diffusion, changes in the diffusion characteristics of tube, due to compositional changes and thermal ageing of the tube, in contact with liquid sodium will have an insignificant effect on the detector calibration.

Since the refractory metal coating is shielded from the sodium it will not be subjected to corrosion or deposition. At the temperature of operation (1,000°–1,100°F), there will be no thermal ageing or solid state diffusion into the coating to change its diffusion characteristics. Thus, the invention will eliminate frequent calibration checks during long term operation.

Referring now to the drawing, the illustrated embodiment of the hydrogen concentration detection or measuring device incorporating the invention comprises: a diffusion tube 10 connected via a sodium seal 11 to an ion pump 12 for maintaining a high vacuum within tube 10, as indicated at 13, and a pump power supply and current readout mechanism indicated generally at 14 connected to ion pump 12 via a cable 15. Inasmuch as the details of ion pump 12 and the power supply and current readout mechanism 14 do not constitute part of the invention and are known in the art, as evidenced by above-cited U.S. Pat. No. 3,683,272, detailed description thereof is believed unnecessary. Diffusion tube 10 is externally surrounded by liquid sodium 16 while the inner wall surfaces thereof is coated with a thin layer of refractory material 17. For example, tube 10 may be constructed of either nickel or stainless steel with the coating or layer 17 being of either tungsten or molybdenum. Also, tube 10 may have a length of 40 inches, a wall thickness of 10–20 mils, and an outside diameter of 0.375 inch, and operate in sodium at a temperature of 1,100°F., for example.

By using a coating or layer 17 of either 0.1 mil of tungsten or 5 mils of molybdenum on the inside of a 10 mil wall 304 type stainless steel tube 10, a 20 percent change in the hydrogen permeation constant of the stainless steel will result in only a 4 percent change in the detector sensitivity. By using a nickel tube the sensitivity can be increased further, for example, a 20 mil wall nickel tube 10 with a 0.1 mil tungsten coating or a 5 mil molybdenum coating will only change calibration by 2 percent when the nickel permeation constant changes by 20 percent.

The sensitivity of the herein described hydrogen detector will be approximately 4 ppb of hydrogen per microamp of ion pump current. This sensitivity is for a 40 inch by 0.375 inch O.D. tube operating at 1,100°F. This was calculated from measurements made with a 304 stainless steel detector operating in sodium.

The present invention provides the following improvements over hydrogen detectors used heretofore:
1. The problem of frequent re-calibration of the conventional diffusion tube type hydrogen detector has been eliminated.
2. The improved detector, once calibrated and aged in flowing sodium for 100 hours, will not change its diffusion characteristics when used on-line for several years.

While a particular embodiment of the apparatus has been illustrated and particular materials therefor have been described, modifications and changes will become apparent to those skilled in the art, and it is intended to cover in the appended claims all such modifications as come within the spirit and scope of the invention.

What we claim is:
1. In a hydrogen detector for measuring hydrogen concentration in liquid sodium comprising a thin-walled diffusion tube constructed from material selected from the group consisting of nickel and stainless steel, ion pump means connected to create a vacuum within said diffusion tube, and power supply and current readout means connected to said ion pump means; the improvement comprising a thin layer of refractory metal selected from the group consisting of tungsten and molybdenum coated on inner wall surfaces of said diffusion tube for controlling the rate of permeation of hydrogen in surrounding liquid sodium through said diffusion tube.

2. In the hydrogen detector defined in claim 1, wherein said diffusion tube is constructed from stainless steel having wall thickness of about 10 mils, and wherein said refractory metal coating is selected from the group consisting of about 0.1 mil thick tungsten and about 5 mil thick molybdenum.

3. In the hydrogen detector defined in claim 1, wherein said diffusion tube is constructed from nickel having a wall thickness of about 20 mils, and wherein said refractory metal coating is selected from the group consisting of about 0.1 mil thick tungsten and 5 mil thick molybdenum.

* * * * *